United States Patent [19]

Takeda et al.

[11] Patent Number: 4,593,154

[45] Date of Patent: Jun. 3, 1986

[54] LOOP-TYPE DATA TRANSMISSION/RECEPTION NETWORK

[75] Inventors: Hitoshi Takeda; Norimasa Kishi; Tadashi Suzuki, all of Yokohama; Minoru Tomikashi, Zushi; Tooru Futami, Yokosuka, all of Japan

[73] Assignee: Nissan Motor Company, Limited, Japan

[21] Appl. No.: 625,432

[22] Filed: Jun. 28, 1984

[30] Foreign Application Priority Data

Jul. 8, 1983 [JP] Japan ................................. 58-124350
Jul. 11, 1983 [JP] Japan ................................. 58-125830

[51] Int. Cl.⁴ .......................................... H04L 11/15
[52] U.S. Cl. .................................... 178/2 D; 370/86; 370/16
[58] Field of Search ............ 178/2 A, 2 C, 2 D, 71 R, 178/2 R; 370/86, 89, 16; 340/825.05; 455/601

[56] References Cited

U.S. PATENT DOCUMENTS 4,048,446  9/1977  Hafner et al. .......................... 370/16
4,333,178  6/1978  Farrington ............................ 455/601
4,516,121  5/1985  Moriyama et al. .............. 340/825.05

FOREIGN PATENT DOCUMENTS 2644616   4/1978  Fed. Rep. of Germany .
57-129048 10/1982  Japan .
2064919   6/1981  United Kingdom .

OTHER PUBLICATIONS

IBM Technical Disclosure Bulletin; "Automatic Loop Reconfigurator"; vol. 19, No. 10, Mar., 1977; G. J. Laurer & R. O. Skatrud.
IBM Technical Disclosure Bulletin; "Turn-Around Fault Bypass in Single-Rail Loop Communication Network"; vol. 14, No. 12; L. M. Audretsch, Jr. and M. Elsner.
U.S. Ser. No. 592,547, Mar. 1984, Suzuki et al.

Primary Examiner—Stafford D. Schreyer
Attorney, Agent, or Firm—Lane and Aitken

[57] ABSTRACT

A loop-type data transmission/reception network system has a plurality of data processing stations and a single data transmission/reception route which interconnects said stations in a loop for transmitting necessary data between the stations, each of the stations comprising: (a) means for detecting a break-down in the data transmission/reception route between the station itself and the preceding station; (b) means responsive to the detection of a break-down in the data transmission/reception route between the station itself and the preceding station by the detection means for transmitting break-down information to the subsequent station; and means for reversing the transmission direction in the data transmission reception route in accordance with the break-down information transmitted by the breakdown information transmitting means.

11 Claims, 15 Drawing Figures

| STATION | BREAKAGE LOCATION | ABSENT | BETWEEN C–A | | BETWEEN A–B | | BETWEEN B–C | |
|---|---|---|---|---|---|---|---|---|
| A | FLG 1 | OFF | ON | | ON | | ON | |
| | P set | 0 | 0 | | 2 | | 1 | 3 |
| | SLT 3R | 0 | 83 H | | 81 H | | 82 H | 80 H |
| B | FLG 1 | OFF | ON | | ON | | ON | |
| | P set | 0 | 1 | 3 | 0 | | 2 | |
| | SLT 3R | 0 | 82 H | 80 H | 83 H | | 81 H | |
| C | FLG 1 | OFF | ON | | ON | | ON | |
| | P set | 0 | 2 | | 1 | 3 | 0 | |
| | SLT 3R | 0 | 81 H | | 82 H | 80 H | 83 H | |

4,593,154

LOOP-TYPE DATA TRANSMISSION/RECEPTION NETWORK

BACKGROUND OF THE INVENTION

1. Field of the Invention

The present invention relates to a loop-type data transmission/reception network which can assure trouble-free transmission and reception of information from and to each data communication station if any part of the data transmission/reception route (i.e., common data bus) is disconnected.

2. Description of the Prior Art

A conventional loop-type network of data transmission/reception is exemplified by Japanese Patent Application Publication No. 57-129048, the disclosure of which is hereby incorporated by reference.

The disclosed system comprises, e.g., as shown in FIG. 1, three stations A, B, and C interconnected via a single data transmission/reception route (common data bus) to form a loop, the processed data in each station being transferred to the adjacent station only in one direction as shown by the arrow in FIG. 1, i.e., the counterclockwise direction as viewed in FIG. 1.

On the other hand, in systems connected in a loop with a single data transmission/reception route, when a break in the transmission/reception route occurs, the whole system will be hung up since no information can be transferred and, therefore, it cannot be transmitted past the station at which the data transmission/reception route has broken down. Therefore, to prevent such a system hang-up, a countermeasure (system back-up) has been commonly used-namely, a so-called loop-back method to be described below.

That is to say, if the part of the data transmission/reception route labelled $L_3$ for unidirectionally transmitting information from the station C to the station A is broken (disconnected), the station A detects the break-down of the data transmission/reception route $L_3$ due to the absence of received data from the station C for a predetermined period of time and informs the remaining stations B and C that leg $L_3$ of data transmission/reception route has broken down. Thereafter information can still be sent to each station by performing bidirectional transmission between each station via the remaining legs of the data transmission/reception route at a predetermined timing in a sequence which can be illustrated as A→B→C→B→A→B . . . .

As described above, the loop-back processing is carried out if one leg of the data transmission/reception route breaks down.

As shown in FIG. 2, each station (station B is shown as an example in FIG. 2) is provided with a switch circuit 1 which controls the direction of transmission/reception of data. During a normal operation of the data transmission/reception ring (i.e., the data is transmitted or received in the unidirection), an input bus In is connected to a leg of the data transmission/reception route $L_1$ leading from the station A at the previous stage of the network and an output bus OUT is connected to another leg of the transmission/reception route $L_2$ leading to the station C at the next stage.

In such a configuration, if the break-down described above occurs, the switch positions of the switch circuit 1 are changed at predetermined intervals to reverse the directions of data transmission and reception.

In FIG. 2, numeral 2 denotes a Central Processing Unit for controlling the overall data processing performed at each station, and numeral 3 denotes an interface called SCI (Serial Communication Interface) for inputting and outputting the transmission/reception signals serving to convert the bits of information from parallel (byte-wide) form to serial (bit-wide) form and from serial to parallel form. In addition, the Read-Only Memory (ROM) 4 and Random-Access Memory (RAM) 5 are memories used by the microcomputer, and interface 6 denotes an input/output port used by the microcomputer. One example of a microcomputer of such configuration is HD-6801 manufactured by Hitachi Co., Ltd.

The configuration of information packets to be transmitted in the above-described network system, i.e., the data of a single frame comprises, as shown in FIG. 3, a marker slot SYN for identifying the frame, two channel slots SLT 1 and SLT 2 and subsequent break-down information slot SLT 3 for reporting the break-down state of the data transmission/reception network. The slot SLT 3 comprises an eight-bit code conveying the above-described break-down information.

For example, in the case when a break-down occurs in the data transmission/reception leg $L_3$ between the stations C and A, the station A detects the break-down in the data transmission/reception leg $L_3$ after it fails to receive any data for a period exceeding a predetermined time. Thereafter, the station A transmits a byte to the station B in the next stage in which a most significant bit (MSB) $D_7$ is set to a "1" and the remaining bits are set to "0" as represented by (10000000) in binary form and by "$80_H$" in hexadecimal-coded decimal form (H denotes a hexadecimal-coded decimal notation).

The station B determines from the above-described byte received from the station A in which the most significant bit is "1" that there is a break-down in the data transmission/reception route and furthermore sends the same information on the break-down to the station C. Together with the transmission of the break-down information to the station C, the direction of the transmission/reception direction is switched at predetermined intervals after the passage of a predetermined time $T_B$.

In a similar way, the station C also recognizes that a break-down has occurred from the break-down-representative data received from the station B and thereafter switches its direction of communication repeatedly at predetermined intervals after the passage of a predetermined time $T_C$.

The above-described operation is diagrammatically shown in FIG. 4. In this drawing, prior to the occurrence of the break-down (prior to detection of the break-down at time $t_0$), the communication direction of all of the stations A, B, and C is constant and in the counterclockwise direction (represented by L in this drawing). However, after the time $t_0$, each station performs bidirectional communication by switching the transmission directions between the counterclockwise (L) and clockwise (R) directions at a constant frequency.

In this way, after the break-down of the data transmission/reception route is detected, all of the information can be transmitted to all of the stations if each station is transferred into an operation mode in which the direction of the data transmission/reception is repeatedly switched at a constant frequency.

However, as described above, if the period of reversal of the communication direction during bidirectional communication is set to the same period $T_1$ for all of the stations, each station will not be able to recognize whether the information is received by the destination station. Therefore, in order to ascertain that the information is received by the destination station, it is necessary to increase the number of times the data transmission is repeated or to prolong the reversal period of the above-described transmission direction, thus reducing the transmission speed accordingly.

In addition, since the period of reversal of the above-described communication direction is carried out by means of independent timers incorporated in each station, there may be some deviation of reversal timing of the communication direction among the stations because of the tolerances in accuracy of the respective timers incorporated in the stations. Therefore, the deviation will increase as time passes even though the deviation will be small initially. Consequently, such a condition will result in the communication directions of adjacent stations being completely reversed (for example, in the case when a specific station is transmitting in the counterclockwise direction, the adjacent station performs communication in the clockwise direction). In this case, neither transmission nor reception of data between adjacent stations is possible.

SUMMARY OF THE INVENTION

With the above-described problems in mind, it is an object of the present invention to provide a loop-type network system which can improve the reliability of data communications between stations when bidirectional loop-back-type communication is being performed after break-down of the data transmission/reception route and which can prevent the loss of data due to deviations in the timing of reversal of the communication direction.

This can be achieved by providing a loop-type data transmission/reception network system having a plurality of stations and a data transmission/reception route, each station including (a) means for detecting break-downs in the data transmission/reception route between the station itself and adjoining station in a second direction opposite to a first direction in which the data is normally transmitted; (b) means responsive to the detection of a break-down in the data transmission/reception route between the station itself and adjoining station by the detecting means for transmitting the break-down information to either one of the adjoining stations according to the transmission direction; and (c) means for transmitting the information on a reversal of the transmission direction of data in the station itself via the data transmission/reception route to the adjoining station together with the break-down information transmitted by the break-down information transmitting means.

FIG. 5(A) shows a general construction of a first preferred embodiment according to the present invention. The loop-type network system according to the present invention comprises a plurality of stations (A, B, C, and D) and a single common bus (data transmission/reception route) for interconnecting the stations in a loop so that information can be transmitted in a single direction around the loop when the common bus normally interconnects the stations.

Each station comprises: (a) a line-break-down detection means 101 for detecting the break-down in the leg of the data transmission/reception route between the station itself and station at the previous stage from which the data is to be received; (b) a break-down information transmission means 102 for transmitting break-down information to the next station in the direction of transmission so as to report the occurrence of the break-down of the data transmission/reception route; and (c) a transmission-direction reversing means 103 for reversing the data transmission/reception direction at the station itself when a predetermined condition is satisfied.

When the above-described break-down is detected, an operation for reversing the direction of data transfer is started by the station which detected the break-down of the data transmission/reception route and this operation of reversal of the transmission direction is taken up by each of the subsequent stations sequentially. Simultaneously, the data transmission/reception network system is reconfigured such that the phase of the above-described reversing operation of communication direction propagates back and forth from the station which first detected the break-down of the data transmission/reception route to the station preceding said first station which detected the break-down of the data transmission/reception route in the original broken data transmission/reception direction.

For example, when a data transmission/reception path which conducts information from the station D to the station A breaks down as shown in FIG. 5(A), the break-down of that leg is detected by the station A. Thereafter, the data communication direction is changed so as to transfer data along the route A→B→C→D→C→B→A→B→ .... Therefore, the reversal of the communication direction repeatedly reciprocates over all of the stations delimited by stations A and D sandwiching the break-down point, as indicated by the arrows in FIG. 5(A).

Furthermore, as a second embodiment of the present invention shown in FIG. 5(B), each station is provided with a timing information transmission means 104 for transmitting timing information representing the number of stations from the break-down location to the current station.

BRIEF DESCRIPTION OF THE DRAWINGS

A more complete understanding of the present invention may be obtained from the accompanying description in conjunction with the attached drawings in which like reference numerals designate corresponding elements and in which.

DETAILED DESCRIPTION OF THE PREFERRED EMBODIMENTS

Reference will be made to the drawings in order to facilitate understanding of the present invention.

Figure 1:
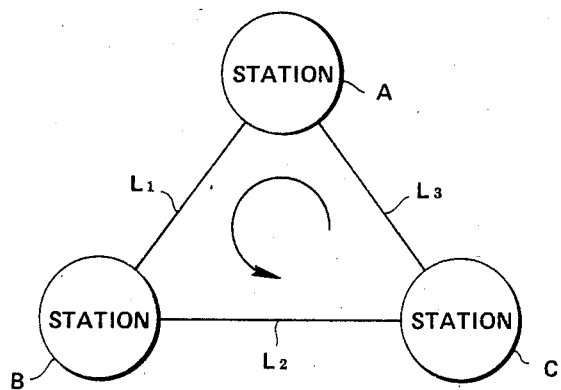
FIG. 1 is a simplified diagram of a loop-type data transmission/reception network disclosed in Japanese Patent Application Publication No. 57-129048.

It should be noted that a loop-type network system of a first preferred embodiment comprises a plurality of stations A, B, and C and a single data transmission/reception bus (a common bus) interconnecting these stations in a loop in the same way as shown in FIG. 1. In addition, each station is constructed as shown in FIG. 2 in terms of hardware.

Figure 2:
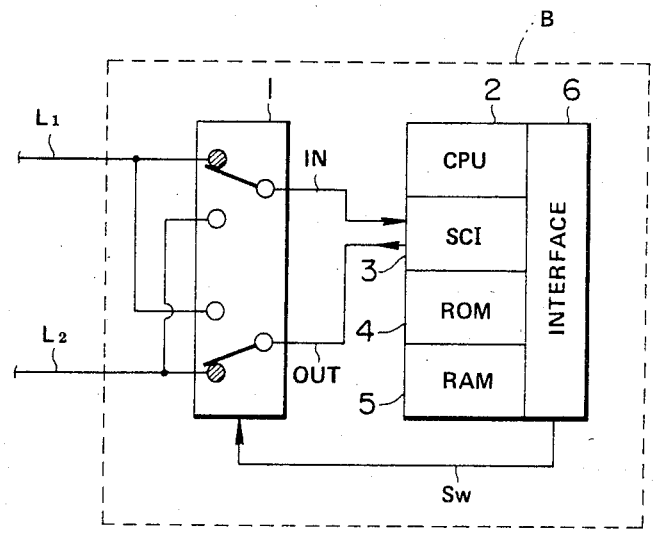
FIG. 2 is a simplified block diagram of the hardware configuration of each station shown in FIG. 1.
Figure 6:
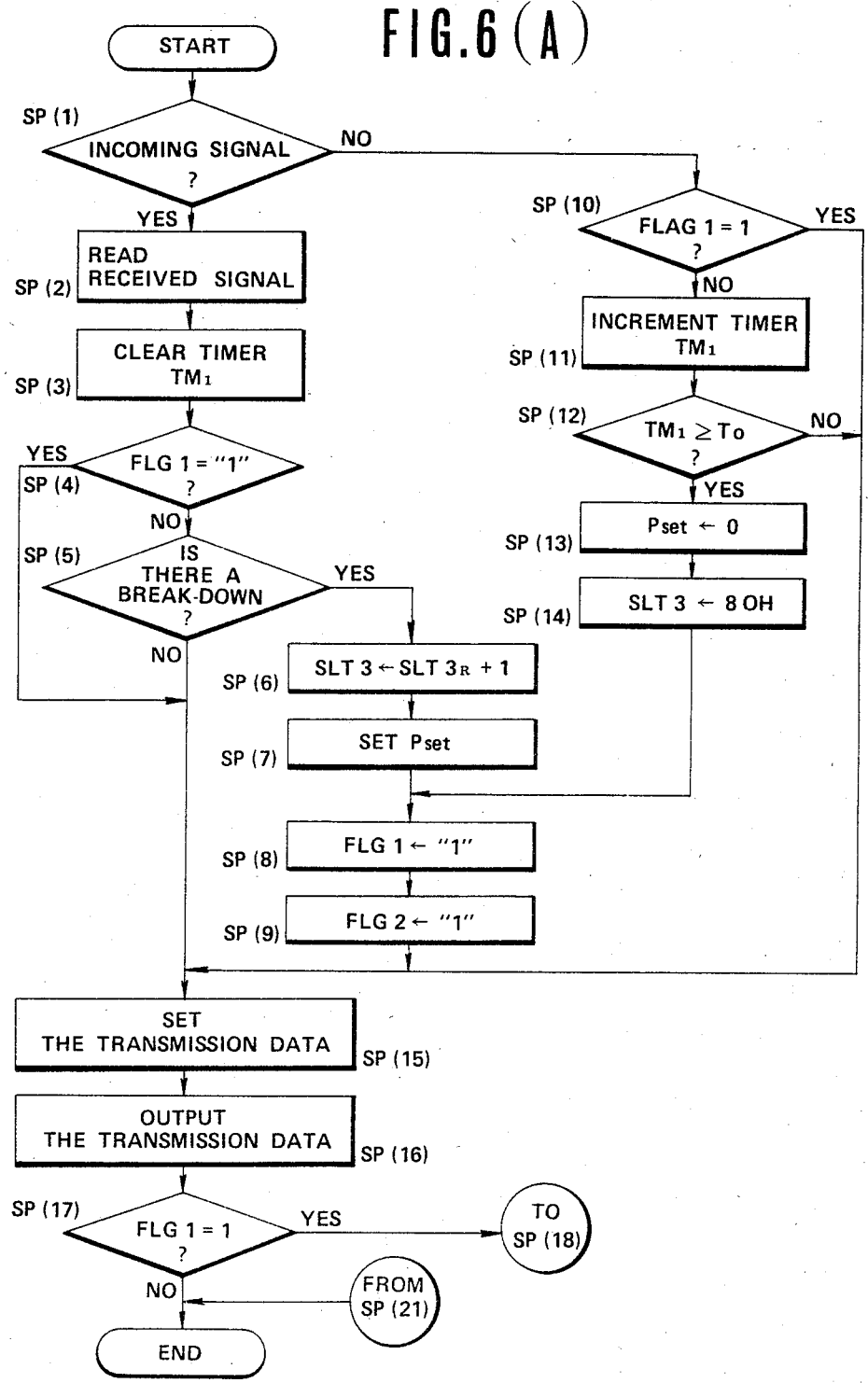
FIGS. 6(A) and 6(B) together form an operational flowchart to be executed by the CPU shown in FIG. 2.
Figure 6B:
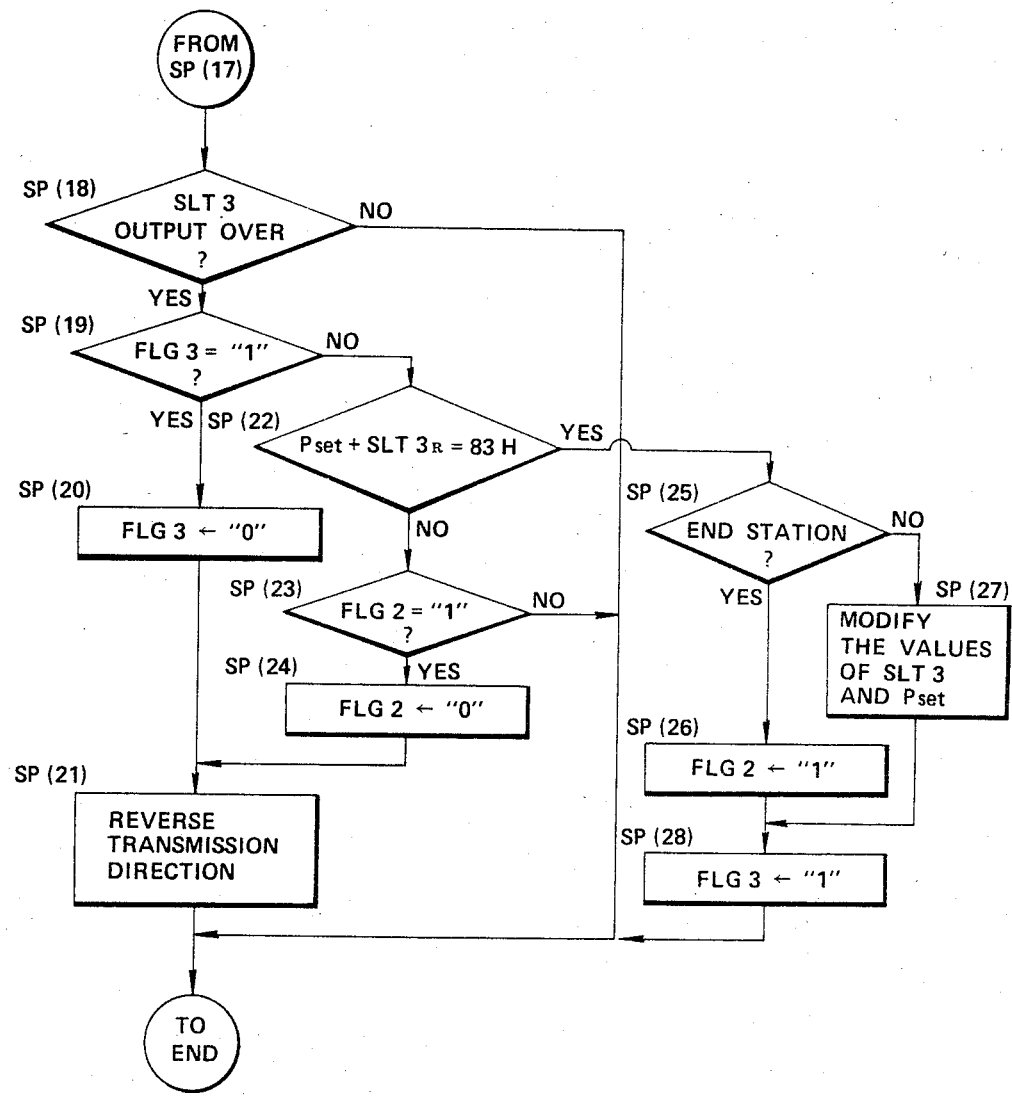

FIGS. 6(A) and 6(B) are operational flowcharts of a single normal- and back-up-operation program to be executed by the CPU (Central Processing Unit) 2 in each station shown in FIG. 2.

Communication control in the loop-type data transmission/reception network system in the first preferred embodiment will hereinafter be described with reference to FIGS. 6(A) and 6(B).

Figure 3:
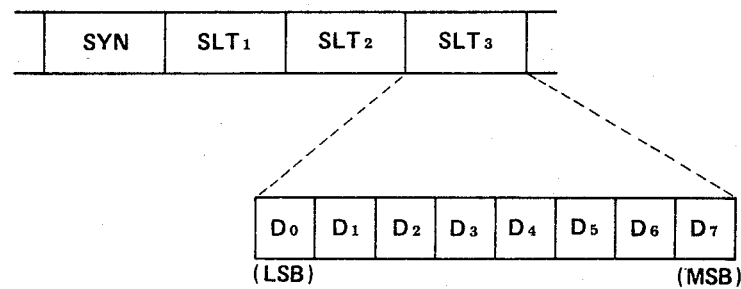
FIG. 3 is a diagram of the format of transmission data.
Figure 4:
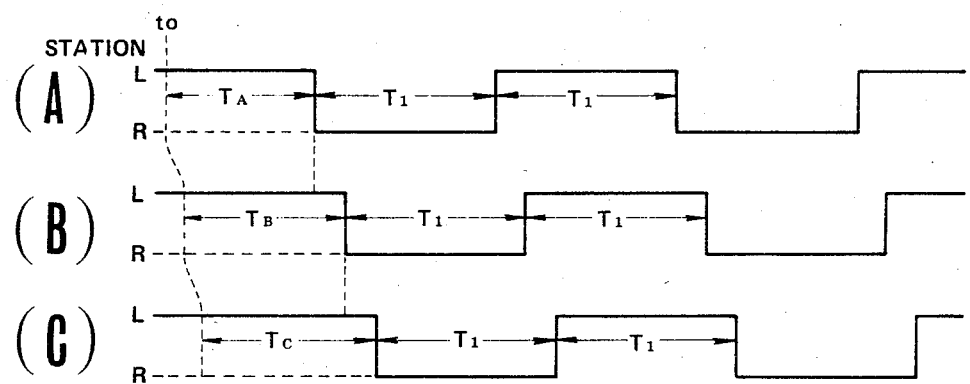
FIG. 4 is a timing chart of the operation of each station after the occurrence of a break-down.
Figure 5A:
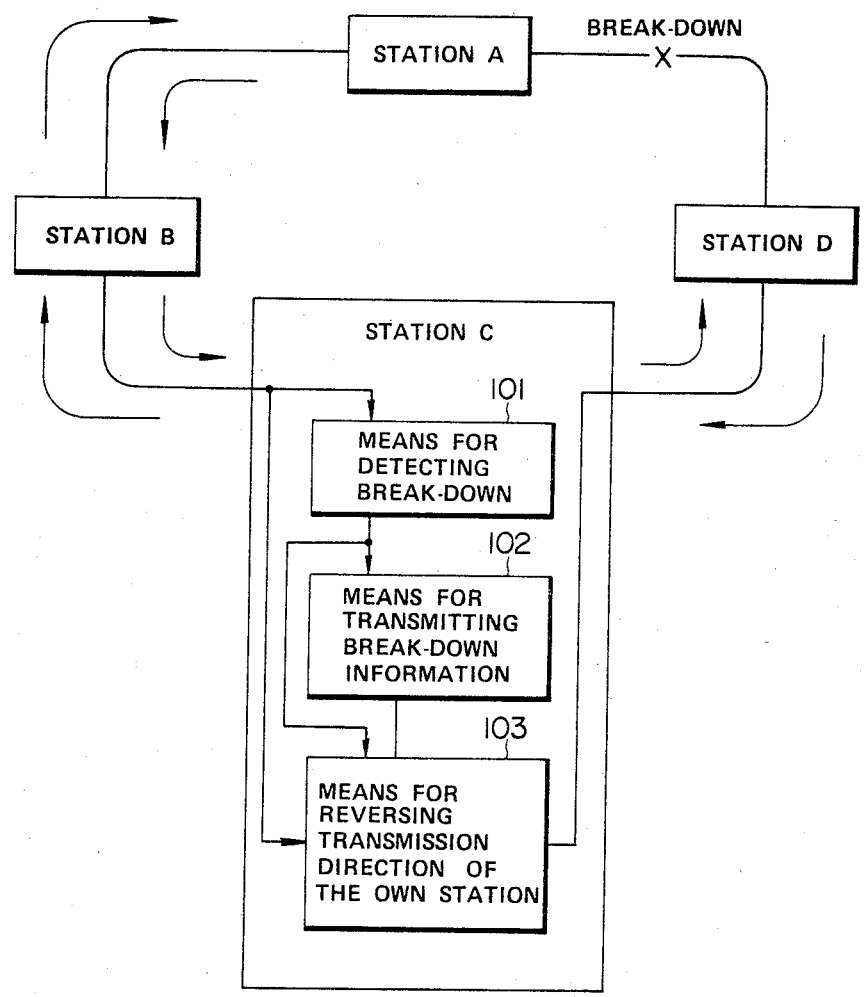
FIGS. 5(A) and 5(B) are simplified block diagrams of the loop-type data transmission/reception system.
Figure 5B:
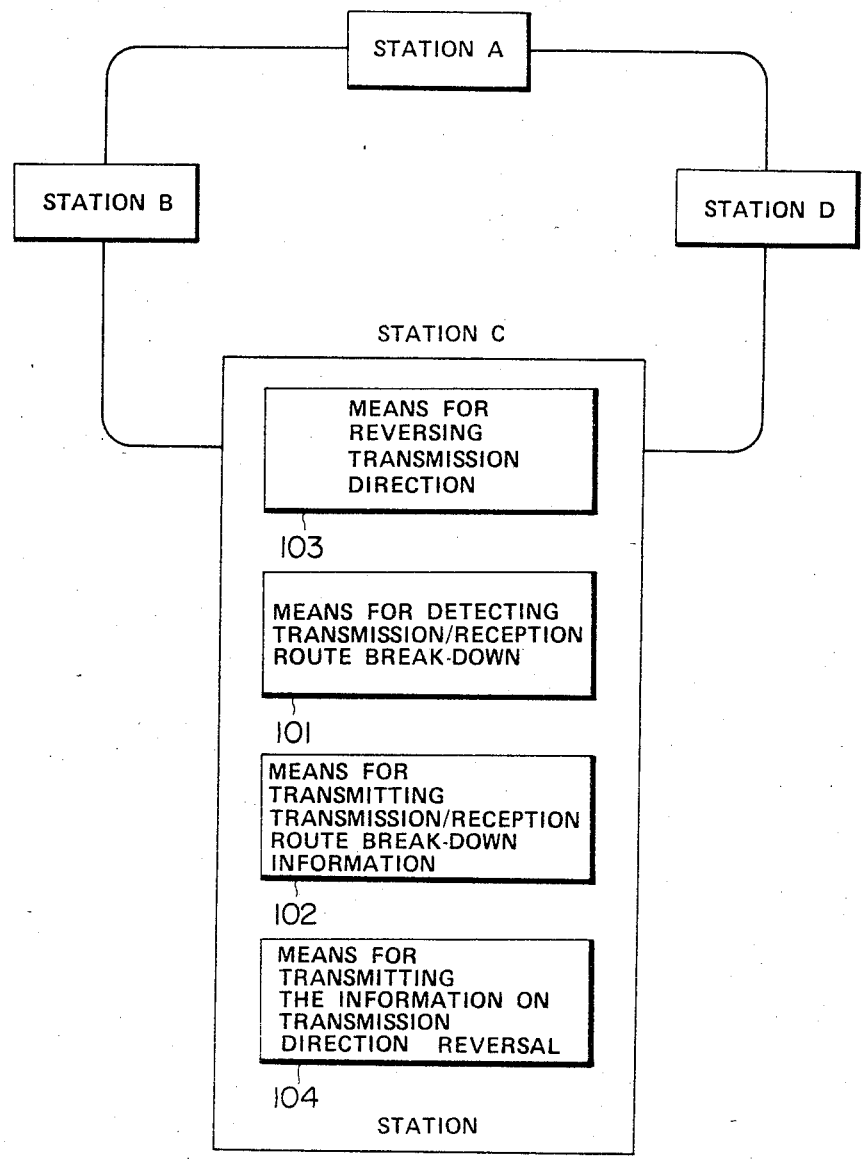

Data to be transmitted or received between each station is formatted in the same way as in the conventional system shown in FIG. 3. That is to say, one frame of data comprises a marker slot SYN identifying the frame and three data slots SLT 1 through 3. SLT 1 and SLT 2 are channel slots which contain data about control signals for terminal equipment to be connected to each station (for example, head lamp, mirror, and turn signal lamp, etc.)

The SLT 3 contains eight bits of break-down information. The information representing the absence of break-down in the bus is represented as $[00]_H$ in binary-coded hexadecimal (also represented as [0000 0000] in binary notation).

Each station in the data transmission/reception route carries out the sequence of steps SP(1)→SP(2)→SP(3)→SP(4)→SP(5)→SP(15)→SP(16)→SP(17) or steps SP(1)→SP(10)→SP(11)→SP(12)→SP(15)→SP(16)→SP(17) within a known interval of time, thus transmitting information in a single direction (counterclockwise direction as in the conventional system shown in FIG. 1). In step SP(1), the CPU 2 determines whether a signal has been received by the SCI 3 from bit state of the SCI 3. In the step SP(2), the CPU 2 reads the received signal from the SCI 3 into the CPU 2 itself. In the step SP(3), the software timer TM 1 is cleared, which timer is used to detect break-downs in data transmission/reception to be described later.

In the step SP(4), the CPU 2 determines whether a flag FLG 1 is zero, the flag FLG 1 indicating whether or not bidirectional loop-back-type communication is being performed. In this case, the FLG 1 is zero since the data transmission/reception route is normal and the result at step (4) is NO so that the CPU 2 goes to the step SP(5).

In the step SP(5), the CPU 2 reads the data of the break-down information slot SLT 3 from the received data and determines whether the most significant bit (MSB) of the received SLT 3R has been set to a "1". The CPU 2 recognizes that the data transmission/reception route is operating normally when the MSB is at a "0". In the case when the MSB is at a "1", the CPU 2 recognizes that some point of the data transmission/reception route has broken down.

In the above-described step SP(15), the data of each of the slots to be transmitted is set according to known processes outside the scope of this invention. The data for each slot is transmitted whenever the processing shown in FIGS. 6(A) and 6(B) is carried out.

In the step SP(16), the data frame set up in the preceding step (15) is outputted via the SCI 3 onto the corresponding data transmission/reception path.

In the step SP(17), the CPU 2 again determines whether the above-described flag FLG 1 has been set to "1". Since in this case the flag FLG 1 has remains at "0", the result is "NO" and one cycle of execution in FIGS. 6(A) and 6(B) has been completed.

Next, the operation of each station at the time of occurrence of break-down in part of the data transmission/reception route will be described below.

For example, let us assume that a break-down in one leg $L_3$ of data transmission/reception route between the stations C and A has occurred.

First, in the station A, the result at the step SP(1) shown in FIG. 6(A) is "NO" since data from the preceding station C can not be received. Thereafter, the routine goes to the step SP(10).

In the step SP(10), the CPU 2 of the station A determines whether the flag FLG 1, indicating whether or not bidirectional communication in the loop-back method is being executed, is zero. In the station A, since the flag FLG 1 is still zero, the result is "NO" and the routine goes to the steps SP(11) and SP(12).

It should be noted that in the step SP(10) the CPU 2 carries out the same processing as the step SP(4).

It should also be noted that the step SP(11) serves to increment the software timer TM 1 for detecting the break-down. Next, in the step SP(12), the CPU determines whether the contents of the above-described timer TM 1 exceeds a preset time $T_0$.

In the step SP(12), the data will not be transmitted from the station C to the station A even after the time indicated by the timer TM 1 exceeds the preset time $T_0$ since there is a break-down in the leg $L_3$ of the data transmission/reception route. Therefore, the CPU 2 of the station A recognizes that a break-down in the leg $L_3$ of the data transmission/reception route has occurred when the time indicated by the software timer TM 1 reaches the preset time $T_0$. Thereafter, the routine goes to the step SP(13).

In the step SP(13), the CPU 2 resets to "0" a distance data variable Pset representing how many stations distant from the point where the break-down occurred the subsequent station is. That is to say, as described above, since the break-down occurred in the leg $L_3$ of the data transmission/reception route between the stations C and A and the station A is located at the break-down location, a distance value of "0" is stored in the distance variable Pset of the station A. Therefore, the distance variable Pset in the subsequent station B stores a distance value of "1" and that in the subsequent station C stores the value "2". The significance of these values will be described later.

Next in the step SP(14), the CPU 2 writes the value "$80_H$" in binary-coded hexadecimal representation into the break-down information slot SLT 3 to be transmitted. That is to say, "1" is written into the MSB (Most Significant Bit $D_7$) of the break-down information slot SLT 3 comprising eight bits of data. Thereafter, the steps SP(8) et seq. are executed in which the above-described flag FLG 1 is set to "1" to indicate that the station A has entered the bidirectional communication mode with the adjacent station B.

In the following step SP(9), the CPU 2 sets flag FLG 2 to a "1", the flag FLG 2 indicating the control of the communication direction reversal process.

As described above, in the station A, the values of the distance data variable Pset, break-down information slot SLT 3 and the flags FLG 1 and FLG 2 are all set.

Immediately thereafter, the steps SP(15) and SP(16) cause the contents of the break-down information slot SLT 3 set in the step SP(14) ("$80_H$") to be transmitted to the subsequent station B.

From the next step SP(17), since the flag FLG 1 was set to "1" in the above-described step (8) so that the determination result is YES, control passes to step SP(18) is executed.

In the step SP(18), the CPU 2 determines whether the output of the above-described break-down information slot SLT 3 has been completed. The result is "NO" during the output of the break-down information slot SLT 3. The next step SP(21) is carried out after completion of the output of the break-down information slot SLT 3.

In the step SP(19), the CPU 2 determines whether a flag FLG 3, indicating whether the output of the break-down information slot SLT 3 is completed after reversal of the transmission direction, is set to "1" or not. Since in this case the flag FLG 3 remains at a "0" during the output of the break-down information slot SLT 3, the result is NO so that the CPU 2 executes the next step SP(22).

In the step SP(22), the CPU 2 calculates the sum of the received break-down information slot SLT $3_R$ and the contents of the distance data variable Pset set in the above-described step (13) and determines whether the sum is "$83_H$". At this time, since data from the station C is not received by the station A, the above-described SLT $3_R$ is indefinite and the result is "NO".

Hence, the routine goes to the step SP(23) wherein the CPU 2 determines whether the flag FLG 2 set in the above-described step SP(9) is at a "1" or "0" (that is to say, whether it holds a value of "1" or not). In this case, since the contents of the flag FLG 2 has been set to "1" in the above-described step SP(9), the result is "YES", and so control passes to the following step SP(24).

In the step SP(24), the CPU 2 decrements the contents of the flag FLG 2 by 1 i.e., resets the flag FLG 2 to a "0" so that the contents of the flag FLG 2 in the station A is again turned to "0".

Thereafter, the routine goes to the step SP(21) in which the switching signal is outputted via the interface 6 to the switch circuit 1 to reverse the data transmission/reception direction shown in FIG. 2 (in this case, the transmission direction in the station A is reversed from the counterclockwise direction to the clockwise direction).

The above-described series of operation will be described with reference to the operational timing chart shown in FIG. 8.

The station A detects the break-down in the leg $L_3$ of the data transmission/reception route between the stations C and A at time $T_{a1}$. After transmitting the predetermined break-down information of the station B, the transmission direction is reversed from the counterclockwise direction (L) to the clockwise direction (R) as shown in $A_1$ of FIG. 8.

Thereafter in the station A, the following sequence of steps is repeatedly carried out: SP(1)→SP(10)→SP(15)→SP(16)→SP(17)→SP(18)→SP(19)→SP(22)→SP(23)→END→SP(1)→....

Next, the processing executed by the station B after the break-down information slot SLT 3R is received from the station A at time $t_{b1}$ will be described with reference to FIG. 8.

In more detail, when the break-down information is received from the station A, the sequence step SP(1)→step SP(2)→step SP(3)→step SP(4)→step SP(5)→step SP(6) ... is carried out. In the step SP(5), the CPU 2 determines whether the most significant bit (MSB) of the received break-down information slot SLT 3R is at a "1". The answer is YES since the break-down information slot SLT 3R from the station A was changed to "$80_H$". Therefore, the routine goes to the step SP(6).

In the step SP(6), the CPU 2 of the station B adds 1 to the break-down information slot SLT $3_R$ ("$80_H$") received from the station A to derive the value of the brea-down information slot SLT 3 to be transmitted from the station B. Therefore, in this case, the value of the break-down information slot SLT 3 becomes "$81_H$".

Next in the step SP(7), the value of the distance variable Pset is derived by the station B. Specifically, after the addition of "1" to the value of the received break-down information slot SLT $3_R$, a value wherein the most significant bit (MSB) is reset to "0" is assigned to the distance variable Pset. Since in this case the value of the received break-down information slot SLT $3_R$ is "$80_H$", the addition of "1" to the received break-down information slot SLT $3_R$ yields "$81_H$" and the value of the distance variable Pset yields "$01_H$" (hereinafter represented by "1") after the most significant bit is reset to "0".

In summary, the station B is programmed such that after the reception of the break-down information slot SLT 3, the value of which is "$80_H$" from the station A, the value of the break-down information slot SLT 3 to be retransmitted is changed to "$81_H$" and the distance variable Pset is set to "1" ($01_H$).

The data is then transmitted in the steps SP(15) and SP(16). Since the answer at the subsequent step SP(17) is YES, the step SP(18)→SP(19)→SP(22) will be executed next.

Since, in the above-described step SP(22), the value of the distance variable Pset is "1" and the value of the received break-down information slot SLT $3_R$ is "$80_H$", their sum is "$81_H$" and so the answer at the step SP(22) is NO. Thereafter, the sequence of steps SP(23)→SP(24)→SP(21)→ ... is executed. After the flag FLG 2 is reset to the "0" in the step SP(24), the transmission direction in the station B is reversed from the counterclockwise direction (L) to the clockwise direction (R).

Figures 7, 8:
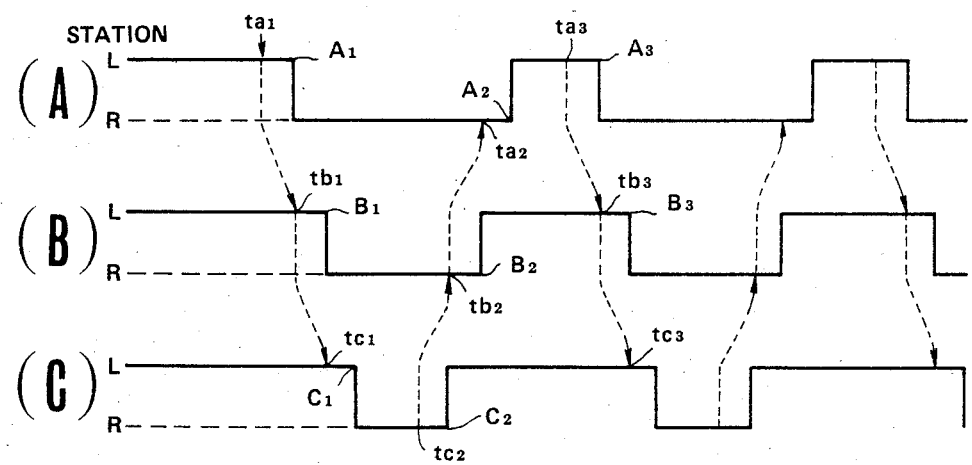
FIG. 7 is a table of conditions under which the data transmission/reception reversing operation will be performed in each station.
FIG. 8 is a timing chart of the operation of each station in the system after detection of a break-down of a first preferred embodiment.

FIG. 8 illustrates the above-described operation. After the above-described processing is executed, starting at time $t_{b1}$ at which the station B receives the break-down information slot SLT 3R ($=80_H$) from the station A, and the station B sends the break-down information slot SLT 3 ($=81_H$) to the station C, the communication direction is changed from the counterclockwise direction (L) to the clockwise direction (R) at time $B_1$ shown in FIG. 8. Thereafter, the series of steps:

SP(1)→SP(10)→SP(15)→SP(16)→SP(17)→SP(18)→SP(19)→SP(22)→SP(23)→END→SP(1) . . . is repeatedly executed.

Although data is to be transmitted from the station B to the station A when the transmission direction is changed to the clockwise direction, the station A executes the routine shown in FIGS. 6(A) and 6(B) by way of the following sequence: SP(1)→SP(2)→SP(3)→SP(4)→SP(15)→SP(16)→SP(17)→SP(18)→SP(19)→SP(22)→SP(23)→END→SP(1)→ . . . and does not again perform the reversal of the communication direction to the counterclockwise direction (L).

It should be noted that since in the step SP(22) in this case, the value of the distance data variable Pset in the station A is "0" ($00_H$) and the value of the break-down information slot SLT $3_R$ received from the station B is "$81_H$", sum is "$81_H$" and the answer at step (22) is NO. In the step SP(23), the flag FLG 2 is already reset to "0" and answer at the step SP(25) is NO.

Next, the processing executed by the station C in response to receipt of the break-down information slot SLT 3 ($=81_H$) from the station B will be explained in detail.

The station C executes the following sequence in response to receipt of the break-down information slot SLT 3 from the station B: steps SP(1)→SP(2)→SP(3)→SP(4)→SP(5)→SP(6) . . . . In the step SP(6), the CPU 2 of the station C adds 1 to the value "$81_H$" of the received slot SLT $3_R$ from the station B to derive the value of the slot SLT 3 to be re-transmitted from the station C. As a result, the value "$82_H$" is written into the break-down information slot SLT 3 in the station C.

Next, in the step SP(7), the same calculation as descrbed in the case of the station B is executed for the distance data variable Pset in the station C. As a result, the value "2" ($02_H$) is stored as the distance data variable Pset.

Thereafter, the flag FLG 1 is set to "1" in the step SP(8) and the step SP(9) is executed. In the step SP(9), the flag FLG 2 is set to a "1".

Thereafter, the series of steps SP(15)→SP(16)→SP(17)→SP(18) are executed and the steps of SP(19)→SP(22) are executed after the break-down information slot SLT 3 is outputted. It should be noted that the slot SLT 3 to be outputted at the step SP(16) is transmitted via the data transmission/reception route in which the break-down has occurred since the station C has not yet changed its transmission direction in the direction of (L).

In the above-described step SP(22), the value of the distance data variable Pset yields "2" ($02_H$) and the value of the break-down information slot SLT $3_R$ received from the station B is "$81_H$". Therefore, their sum satisfies the condition of step (22) so that the step SP(25) is executed next.

In the step SP(25), the CPU 2 of the station C determines whether the station presently executing the step SP(25) is either of the stations sandwiching the break-down location (hereinafter referred to as an end station). In more detail, the CPU 2 of the station C determines whether or not the value of the above-described distance data variable Pset is either "0" or "2". Since the value of Pset in the station C is "2", the answer in this case is YES so that the step SP(26) is subsequently executed. Note that in the shown embodiment, the value "2" represents an end station because are three stations in the network. The value "2" may be replaced by "n−1", where "n" is the number of stations in the system.

In the step SP(26), the CPU 2 sets the flag FLG 2 to "1". Since in this case the value of the flag FLG 2 had already been turned to "1" in the step SP(9), the value of the flag FLG 2 remains "1".

Thereafter, in step (28) the CPU 2 sets the flag FLG 3 to "1" to indicate that transmission of the slot SLT 3 has been completed.

Next, when the cycle starts again from the step SP(1), the series SP(1)→SP(10)→SP(15)→SP(16)→SP(17)→SP(18)→SP(19) is executed. Since in this case the flag FLG 3 has previously been set to "1" in the step SP(28), control will pass from step (19) to SP(20) to reset the flag FLG 3 to "0". Thereafter, control passes to the step SP(21). The function of the step SP(21) is to change the transmission direction, i.e., the communication direction of the station C is reversed from the counterclockwise direction (L) to the clockwise direction (R).

As shown in FIG. 8, the above-described processing is executed starting from time $t_{c1}$ at which the break-down information slot SLT 3 is received from the station B. Once the updated break-down information slot SLT 3 is outputted via the malfunctioning data transmission/reception path $L_3$, the communication direction is changed to the clockwise direction (R) ($C_1$ in FIG. 8).

Next, when the program cycle is started again from the step SP(1) in the station C, the CPU 2 of the station C executes the sequence of steps SP(1)→SP(10)→SP(15)→SP(16)→SP(17)→SP(18)→SP(19) . . . . The processing in the step SP(22) is thereafter executed since the value of the flag FLG 3 is "0" in this case.

At this time, since the transmission direction in the station C is in the clockwise direction (R) and the data transmission/reception route $L_3$ is malfunctioning, no data can be received. Therefore, since the answer at the step SP(22) is NO because of the indefinity of SLT 3R, the step SP(23) is subsequently executed.

Since the flag FLG 2 is set to "1" in the above-described step SP(26), the condition of step (23) is satisfied and control passes to the step SP(24). In the step SP(24), the value of the flag FLG 2 is reset to a "0" so that the value of the flag FLG 2 becomes "0".

Thereafter, the direction exchange is again reversed in the step SP(21). Consequently, the transmission direction in the station C is changed back from the clockwise direction (R) to the counterclockwise direction (L). As shown in FIG. 8, after the transmission direction is changed to the clockwise direction at time $C_1$, the break-down information slot SLT 3 ($=$"$82_H$") is transmitted to the station B starting at time $t_{c2}$. Thereafter, the processing leading to reversal of the communication direction to the counterclockwise direction start at time $C_2$.

Next, when the station B, the communication direction of which is presently in the clockwise direction (R), receives the break-down information slot SLT 3 ($=$"$82_H$") from the station C, it executes the series of steps SP(1)→SP(2)→SP(3)→SP(4)→SP(15)→SP(16)→SP(17)→SP(18)→SP(19)→SP(22).

Since the value of the distance variable Pset in the station B is "1" ($01_H$) and the value of the break-down information slot SLT $3_R$ received from the station C is "82$_H$", their sum is "83$_H$", the condition of step (22) is satisfied. Thus, control passes to the step SP(25).

Since the value of the distance data variable Pset in the station B is "1" the answer at step (25) is NO. Thereafter, the step SP(27) is executed.

In the step SP(27), the value of the break-down information slot SLT 3 to be transmitted from the station B to the station A and the value of the distance data variable Pset are updated.

The modification of the value of the break-down information slot SLT 3 to be transmitted from the station B is carried out by adding "1" to the value of the break-down information slot SLT 3$_R$ received from the station C. Since the break-down information slot SLT 3 (="82$_H$") is received from the station C at this time, the value of the slot SLT 3 in the station B is "82$_H$"+1="83$_H$".

In addition, the value of the distance data variable Pset is the value of the break-down information slot SLT 3 modified by resetting the most significant bit (MSB) to "0". Since in this case the slot SLT 3 is changed to "83$_H$", the value of the distance variable Pset is changed to "3" (03$_H$). After the execution of these steps, the flag FLG 3 is set to "1" in the step SP(28).

When the cycle of execution is started again from the step SP(1), the slot SLT 3 (="83$_H$") is transmitted from the station B to the station A.

After the output of the slot SLT 3 is completed, control passes from the step SP(18) to the step SP(19). Since the flag FLG 3 has previously been set to "1", the flag FLG 3 is now reset to "0" in the step SP(20). Thereafter, after execution of step SP(20), the communication direction of the station B is again changed from the clockwise direction (R) to the counterclockwise direction (L).

As shown in FIG. 8, the above-described processing starts at the time t$_{b2}$ at which the slot SLT 3 (="82$_H$") is received from the station C. Therefore, after the slot SLT 3 (="83$_H$") is transmitted from the station B to the station A, the transmission direction is changed from the clockwise direction (R) to the counterclockwise direction (L) (B$_2$ in FIG. 8).

In addition, the station B will not again perform the changing operation of the transmission direction until the next data frame is received. In this case, the break-down information slot SLT 3 is changed to "83$_H$" and therefore the contents of the distance variable Pset is changed to "3" (03$_H$).

After completion of the above-described processing, the flag FLG 3 is set to "1" in the step SP(28).

Then, when the cycle begins again at the step SP(1), the sequence of steps SP(1)→SP(10)→SP(15)→SP(16)→SP(17)→SP(18) is executed so that the information slot SLT 3 (="83$_H$") is transmitted to the station A from the station B.

After the output of the slot SLT 3 is completed, control will pass from the step SP(18) to the step (19). The flag FLG 3 reset to "0" in the step SP(20) and thereafter the step SP(21) is executed to reverse the communication direction of the station B from the clockwise direction (R) to the counterclockwise direction (L).

As shown in FIG. 8, the above-described processing is executed at time t$_{b2}$ at which the slot SLT 3 (="82$_H$") is received from the station C. Thereafter, the slot SLT 3 (="83$_H$") from the station B to the station A is transmitted and thereafter the communication direction is changed from the clockwise direction to the counterclockwise direction (B$_2$ in FIG. 8).

The station B does not repeat the reversal of the transmission direction until the next data frame is received from the station A.

Although under these conditions the station C can receive data from the station B, the station C does not immediately carry out the reversal of the communication direction since the condition of step SP(22) is not satisfied and the flag FLG 2 is already reset to "0".

Next, when the break-down information slot SLT 3 (="83$_H$") is received from the station B in the station A, in which the transmission direction is currently in the clockwise direction, the following processing is executed in the station A starting at time t$_{a2}$ in FIG. 8.

When the data is received from the station B, the series of steps SP(1)→SP(2)→SP(3)→SP(4)→SP(15)→SP(16)→SP(17)→SP(18)→SP(19)→SP(22) is executed. Since the value of the distance data variable Pset in the station A is "0" and the values of the break-down information slot SLT 3$_R$ received from the station B is "83$_H$", the condition of step (22) is satisfied and the step SP(25) is executed next.

The condition of step (25) is satisfied since the value of the distance data variable Pset in the station A is "0" so that the step SP(26) will be executed next. Therefore, the value "1" is assigned to the flag FLG 2 and thereafter the flag FLG 3 is set to "1" in the step SP(28).

When the cycle starts again from the step SP(1), the CPU 2 of the station A executes the series of steps SP(1)→SP(10)→SP(15)→SP(16)→SP(17)→SP(18)→SP(19). Since the flag FLG 3 is currently set to "1" in the step SP(28) of the previous cycle, the flag FLG3 is reset to "0" in the step SP(22) and thereafter the transmission direction in the station A is changed from the counterclockwise direction (L) to the clockwise direction (R) in the step SP(21).

As shown in FIG. 8, the break-down information slot SLT 3 (="83$_H$") is received from the station B at time t$_{a2}$. Thereafter, the transmission direction is changed from the clockwise direction (R) to the counterclockwise direction (L) at time A$_2$. At time t$_{a3}$, the break-down information slot SLT 3 (="80$_H$") is transmitted to the station B. Thereafter, the transmission direction is again changed at the time A$_3$ from the counterclockwise direction (L) to the clockwise direction (R).

When the station B, in which the transmission direction is in the counterclockwise direction (L), receives the slot SLT 3 (="80$_H$") from the station A at time t$_{b3}$, the series of steps SP(1)→SP(2)→SP(3)→SP(4)→SP(15)→SP(16)→SP(17)→SP(18)→SP(19)→SP(22) is carried out.

Since the value of the distance variable Pset is changed to "3" in the station B and the value of the break-down information slot SLT 3$_R$ received from the station A is "80$_H$", the answer at the step SP(22) is YES and control passes to step SP(25).

Since the value of the distance data variable Pset in the station B is "3" in this case, the condition of step (25) is not satisfied. Thus, the routine goes to the step SP(27) wherein the values of the slot SLT 3 and Pset are modified.

Specifically, the value "81$_H$" is selected to be transmitted by the station B as the value of slot SLT 3 since the contents of the break-down information slot SLT 3R received from the station A is "80$_H$" and is incremented by 1.

In addition, when the most significant bit (MSB) of the contents of the slot SLT 3 is changed to "0" to derive the value of the distance data variable Pset, the value of the distance data variable Pset becomes "1".

After the flag FLG 3 is set to "1" in the step SP(28), the execution cycle of the station B starts again from the step SP(1).

In this repetitive processing, the series of processing steps SP(1)→...→SP(15)→SP(16)→SP(17)→SP(18) is executed so that the break-down information slot SLT 3 (="81$_H$") is transmitted from the station B to the station C.

Thereafter, the step SP(19) is executed. Since the flag FLG 3 has been set to "1", the routine goes to the step SP(20) wherein the flag FLG 3 is reset to "0". The transmission direction is reversed in the step SP(21). Consequently, the transmission direction of the station B is changed from the counterclockwise direction (L) to the clockwise direction (R).

Therefore, the subsequent station C receives again the slot SLT 3 (="81$_H$") from the station B. In the station C, the same processing as described above is executed. That is to say, after the slot SLT 3 (="81$_H$") from the station B is received, the transmission direction is once changed from the counterclockwise direction (L) to the clockwise direction (R). After sending the slot SLT 3 (="82$_H$") to the station B, the communication direction is changed back from the clockwise direction (R) to the counterclockwise direction (L).

The same processing as that described above is executed at stations A and B. As shown in FIG. 8, the reversal of the communication direction is sequentially transferred between adjacent stations and the direction of the transfer of the reversal is reversed at each of the stations sandwiching the break-down location so that the reversal "front" of the communication direction passes back and forth repeatedly among the stations.

In addition, when the station A receives the slot SLT 3 (="83$_H$") from the station B, the reversal of the communication direction is executed and the value of the slot SLT 3 is reset to "80$_H$" and transmitted to the station B.

On the other hand, when the station B receives the slot SLT 3 (="80$_H$") from the station A, the station B transmits the slot SLT 3 (="81$_H$") to the station C and thereafter reverses its communication direction. When the station B receives the slot SLT 3 (="82$_H$") from the station C, the station B transmits the slot SLT 3 (="83$_H$") to the station A and again reverses its transmission direction.

When the station C receives the slot SLT 3 (="81$_H$") from the station B, the station C changes its transmission direction and transmits the slot SLT 3 (="82$_H$") to the station B.

The conditions under which each station changes its transmission direction and the values of the slot SLT 3 to be transmitted therefrom are summarized in FIG. 7.

As appreciated from FIG. 7, the communication is carried out with the most significant bit (MSB) of the break-down information slot SLT 3 turned to the "1" after the occurrence of the break-down in the data transmission/reception route. The conditions are selected so as to reverse the communication direction when the sum of the values of the received break-down information slot SLT $3_R$ and the distance variable Pset in each station equals "83$_H$".

Hence, when the number of stations is increased, the same operation can be carried out if the conditions of the reversal operation shown in FIG. 7 are accordingly changed. That is to say, for example, in the case where there are four stations, the values of the distance variable Pset become 1 through 4 and the values of the slot SLT 3 become "80$_H$" through "84$_H$". When the sum of these values in each station equals "84$_H$", the transmission directions are to be reversed.

In the first preferred embodiment, together with the sequential transfer of the reversal operation of the transmission direction to each station, the reversal operation is reciprocated so that the necessary information can be transmitted to all stations. In addition, the transmission speed will not remarkably be reduced. The loop-back type data transmission/reception system of this embodiment prevents the communications between the adjacent stations from being disrupted by errors in the reversal periods of the communication directions for each station.

Furthermore, since the same operating program is executed by each station, the number of stations can freely be changed.

Figure 9A:
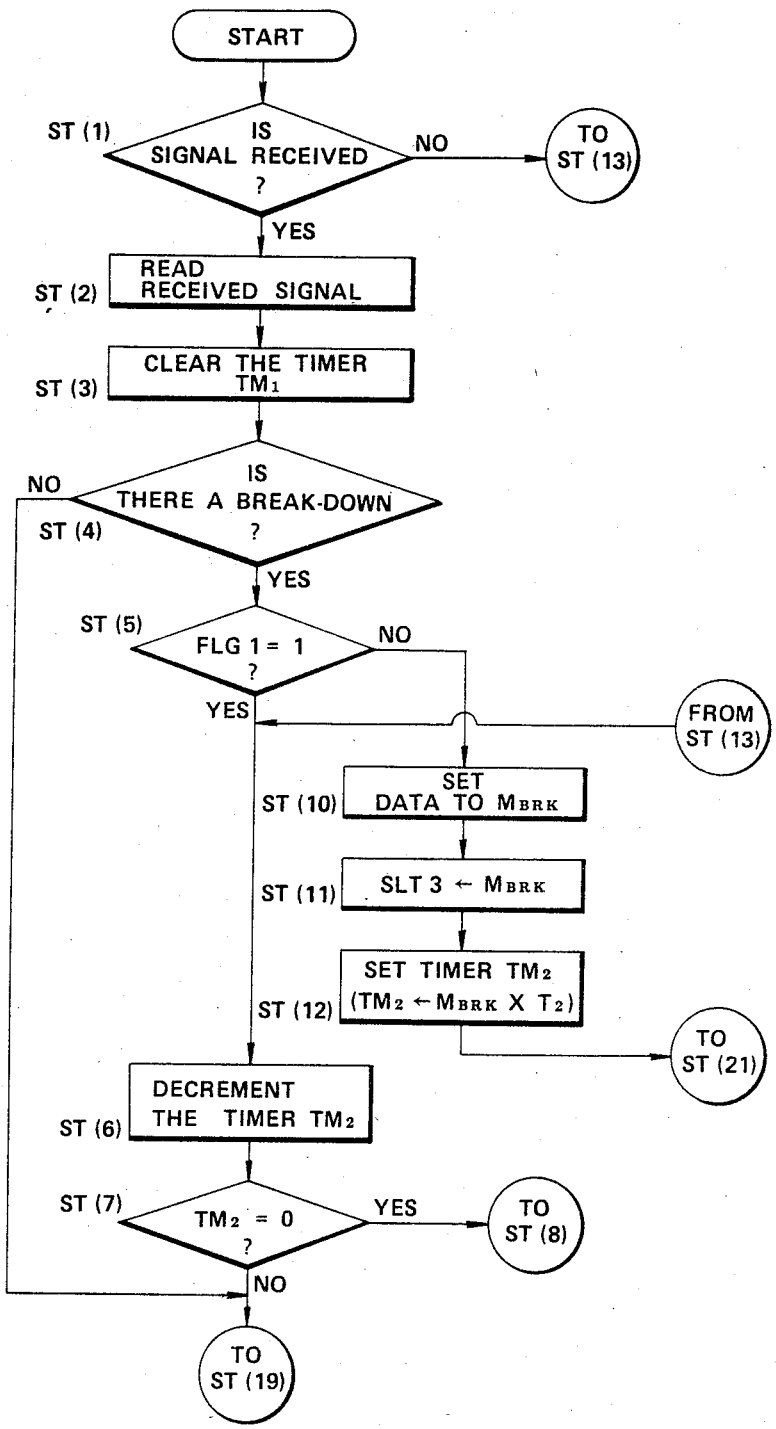
FIGS. 9(A) and 9(B) together form an operational flowchart to be executed by the CPU shown in FIG. 2.
Figure 9B:
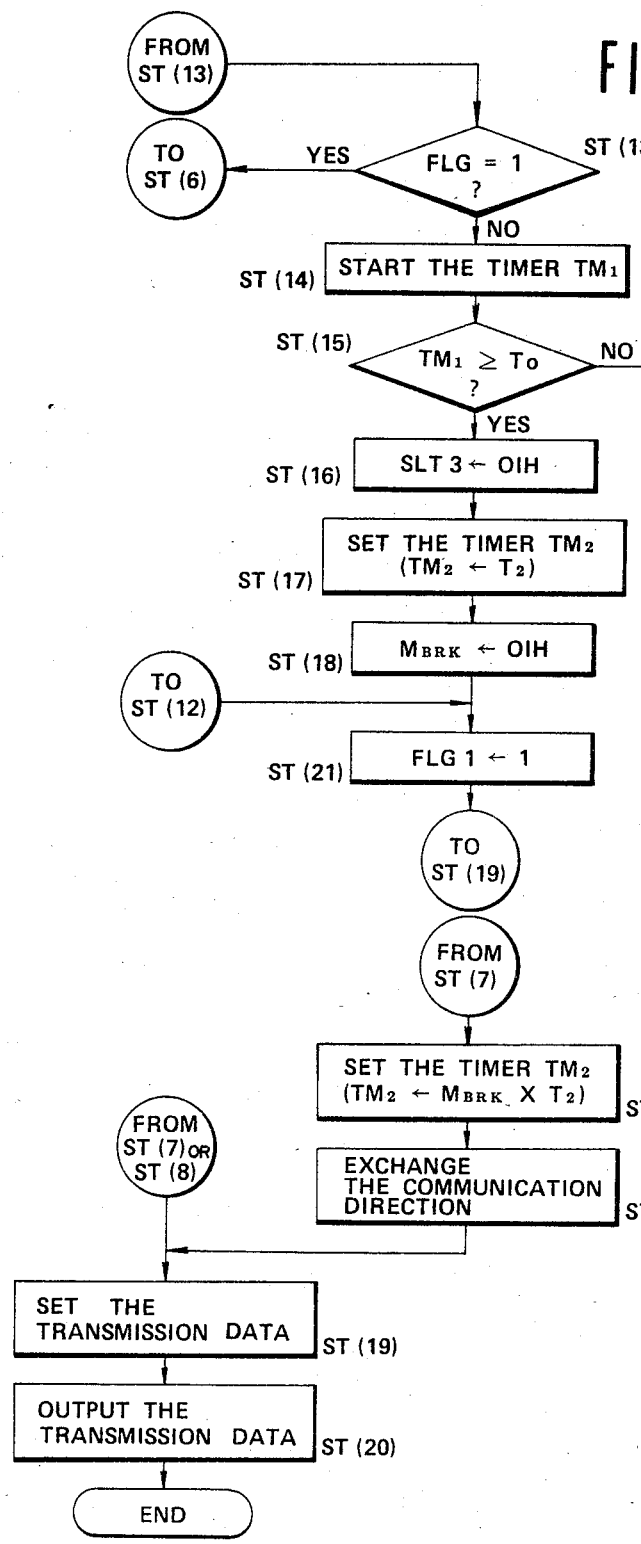

FIGS. 9(A) and 9(B) illustrate a program executed by each station of a second embodiment according to the present invention. It should be noted that the second preferred embodiment comprises a plurality of stations A, B, and C and a single data transmission/reception route in the form of a loop as shown in FIG. 1 and the structure of each station is the same as shown in FIG. 2. The program illustrated by the flowcharts of FIGS. 9(A) and 9(B) is executed by the CPU 2 shown in FIG. 2.

One frame of data to be transmitted between each station comprises, as shown in FIG. 3, a marker slot SYN for identifying the frame and three data slots SLT 1 through SLT 3 as in the conventional data format. The two slots SLT 1 and SLT 2 are channel slots including control signal data for a terminal equipment (for example, head lamp, mirror, and turn signal lamp, etc.) to be connected to each station.

It should be noted that the remaining slot SLT 3 includes a break-down byte comprising eight bits. In more detail, the break-down byte is "00$_H$" in binary-coded hexadecimal representation when there is no break-down in the data transmission/reception route (also represented as "0000 0000" is binary notation).

While the data transmission/reception route is operating normally (there is no break-down in the route), each station transmits data only in one direction around the loop via the steps ST(1)→ST(2)→ST(3)→ST(4)→ST(19)→ST(20)→END→ST(1)→ ... (the counterclockwise direction as shown in FIG. 1 in the same way as the conventional system).

In FIG. 9(A), the CPU 2 of each station in the step ST(1) determines whether a signal has been received by the SCI 3 from the state of the SCI 3 (Serial Communication Interface 3).

The CPU 2 of each station thereafter reads the value of the inputted signal in the SCI 3 into the CPU 2 itself in step ST(2).

The CPU 2 of each station clears a software timer TM 1 used to detect the break-down in the data transmission/reception route in step ST(3).

The CPU 2 of each station reads the break-down information of the slot SLT 3 from among the data received and determines whether the most significant bit (MSB) in the break-down information slot SLT 3 is "1" or "0". If the MSB thereof is "0", the CPU 2 recognizes that the data transmission/reception route is normal (has not broken down) and, on the other hand, the CPU 2 recognizes that the data transmission/reception route is abnormal (has a malfunctioning component) if the most significant bit (MSB) is "1". These steps are the same as those in the first preferred embodiment.

In the step ST(19), the data for the slots to be transmitted is set according to the conventional processing system. Whenever the program of FIGS. 9(A) and 9(B) is executed, the data for each slot is transmitted. In the step ST(20), the data for each slot set in the above-described step ST(19) is outputted via the data transmission/reception route by the SCI 3.

The execution sequence in cases where a break-down occurs in the data transmission/reception route will hereinafter be described for each station sequentially.

For example, when a break-down occurs in one leg $L_3$ of the data transmission/reception route between the stations C and A, data from the station C immediately "upstream" of the station A can not be received by the station A. Therefore, the answer at the step ST(1) is NO and the routine goes to the step ST(13).

In the step ST(13), the CPU 2 of the station A checks the state of the flag FLG 1, which indicates whether the bidirectional communication in the loop-back method is being performed or not as in the first preferred embodiment. Since the flag FLG 1 is still at "0" at this stage in the station A, the answer is NO and the routine goes to the subsequent step ST(14).

In the step ST(14), the software timer TM 1 for detecting break-down is started and in the subsequent step ST(15), the CPU 2 of the station A determines whether the contents of the above-described timer TM 1 exceeds a preselected time $T_0$.

Since no data can be received from the station C due to the break-down in the data transmission/reception route $L_3$, after the timer TM 1 indicates a time exceeding the preselected time $T_0$, the CPU 2 of the station A recognizes that a break-down has occurred in the data transmission/reception route $L_3$ between the stations C and A and executes the subsequent step ST(16).

In the step ST(16), the value "1" is written into the least significant bit (LSB) of the slot SLT 3 for the above-described break-down information, resulting in a byte value represented as "$01_H$" in binary-coded hexadecimal. (H denotes hexadecimal notation used to represent one byte of information).

Next, in the step ST(17) a preselected time $T_2$ is set in another software timer TM 2 which measures a period of communication direction reversal. Thereafter, the value "$01_H$" is stored in a variable $M_{BRK}$ representing the distance from the break-down location (the number of stations from the break-down location) in the step ST(18).

Next, in the step ST(21), the flag FLG 1 is set to "1" to indicate that bidirectional communication is being executed by the loop-back method.

Thereafter, the slot SLT 3 (the value thereof being "$01_H$") set in the step ST(16) is transmitted to the subsequent station B in the steps ST(19) and ST(20).

Next, since the sequence of steps ST(1)→ST(13) has been executed and the flag FLG 1 has been set to "1" at this time, the CPU 2 executes the step ST(6) wherein the value of the timer TM 2 is decremented. Thereafter, the routine goes to the step ST(7) wherein the CPU 2 determines whether the timer value TM 2 is 0 i.e., whether the time indicated by the timer TM 2 has reached the preselected time $T_2$. If the result is NO, the CPU 2 maintains the transmission enable state. If the result is YES, the preselected time $T_2$ is again set in the timer TM 2 in step ST(8) and, then, the communication direction is reversed in the step ST(9).

Figure 10:
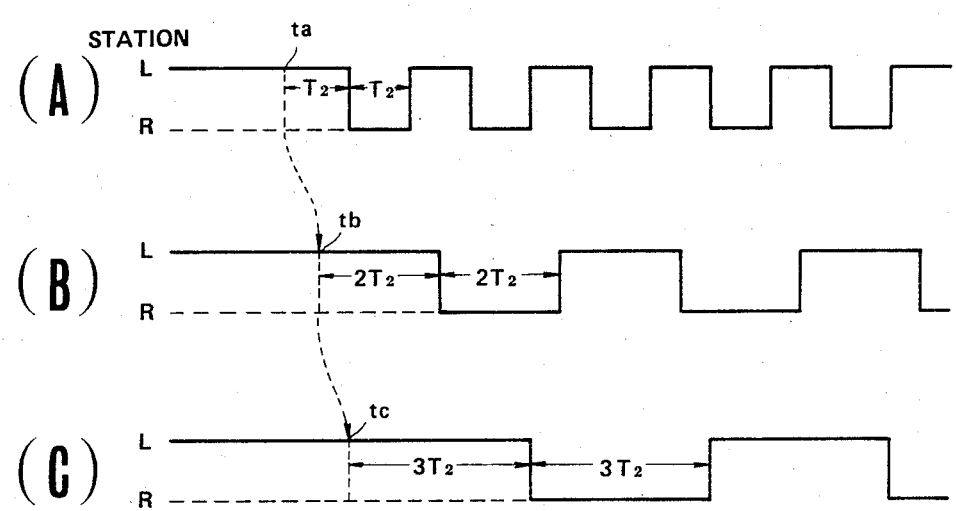
FIG. 10 is a timing chart of an operation of each station after detection of a break-down in a second preferred embodiment.

Thereafter, the series of steps ST(1)→ST(13)→ST(6)→ST(7)→ST(19)→ST(20)→END→ . . . →ST(1)→ST(13)→ST(6)→ST(7)→ST(8)→ST(9)→ST(19)→ST(20) is repeatedly executed. As shown in FIG. 10, the reversal operation is executed to switch the communication direction between the counterclockwise direction (L) and the clockwise direction (R) at a predetermined period $T_2$ starting from time $t_a$ at which the break-down of the data transmission/reception route between the stations C and A was detected.

Next, in the station B, when the slot SLT 3 ($=$"$01_H$") is received from the station A, the CPU 2 of the station B executes the sequence of steps ST(1)→ST(2)→ST(3)→ST(4)→ST(5). Since the execution result in the step ST(5) is NO in the first cycle of execution after break-down, the step ST(10) is executed next.

In the step ST(10), the value "$02_H$" is stored in the distance data register $M_{BRK}$. This corresponds to the number of stations between the break-down location and the station B itself inclusive and the value of the received slot SLT 3R is incremented by "1". The resulting value ("$02_H$" in the station B) corresponds to the order of the station from the break-down location in the original direction of transmission.

Next, in the step ST(11), the value "$02_H$" of the distance data register $M_{BRK}$ is assigned to the break-down information slot SLT 3 to be transmitted to the subsequent station C.

A time equal to the value of the distance data register $M_{BRK}$ multiplied by the reference time $T_2$ for the timer TM 2 is set in the timer TM 2 as a preselected time of the timer TM 2 in order to measure the reversal period of the communication direction of the station itself. That is to say, the preselected time of the timer TM 2 is $2T_2$ in the station B. Thereafter, the flag FLG 1 is set to "1" in the step ST(21) and the slot SLT 3 ($=$"$02_H$") is transmitted to the subsequent station C. Thereafter, the station B executes the following series of steps ST(1)→ST(13)→ST(6)→ST(7)→ST(19)→ST(20)→ . . . →ST(1)→ST(13)→ST(6)→ST(7)→ST(8)→ST(9)→ST(19)→ST(20)→END→ . . . . As shown in FIG. 10, after the slot SLT 3 including the break-down information from the station A is received at time $T_b$, the communication direction is repeatedly reversed between the counterclockwise and clockwise directions whenever the period $2T_2$ has elapsed.

Next, in the station C, when the station C receives the slot SLT 3 ($=$"$02_H$") from the station B, the series of processing steps ST(1)→ST(2)→ST(3)→ST(4)→ST(5)→ST(10)→ST(11)→ST(12)→ST(21)→ST(19)→ST(20)→END is executed. In the step ST(10), the value "$03_H$" is stored in the distance data register $M_{BRK}$ indicating that the station C is the third station from the break-down location. In addition, the preselected time $3T_2$ is set in the software timer TM 2 to determine the communication direction reversal period of the station C.

Hence, the station C executes the reversal of the communication direction repeatedly whenever the period of $3T_2$ has elasped after the slot SLT 3 represented in "$02_H$" is received from the station B.

In this way, the reversal period of the communication direction is set to a value different from that of the adjacent station according to the accumulated number of stations from the break-down location. Even if the accuracy of the timer in each station is inadequate, the communication direction can be ensured to be the same as that of the adjacent station so that the transfer of data can be achieved.

Figure 11:
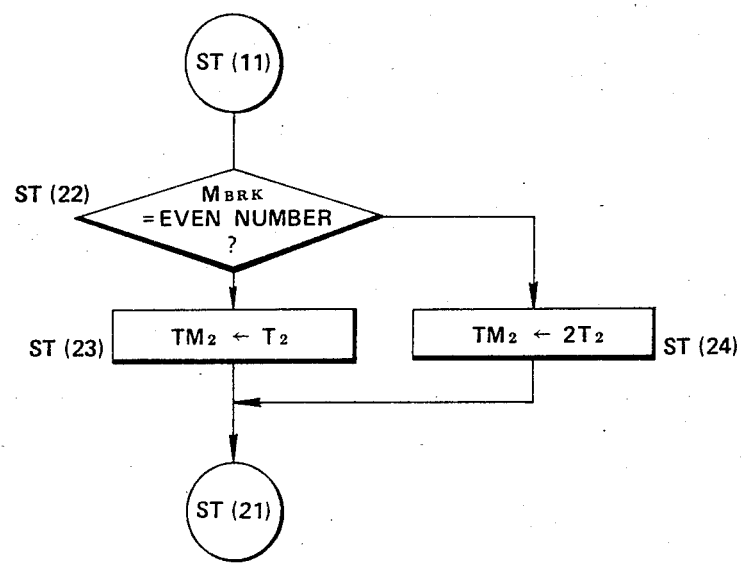
FIG. 11 is another operational flowchart of a main part of a process executed by each station in the second preferred embodiment.

In the above-described embodiment comprising three stations, the period of reversal of the communication direction in each station is progressively increased in proportion to the number of stations from the break-down location. However, the same effect can be obtained by carrying out the processing shown in FIG. 11 in place of step ST(12).

That is to say, the CPU 2 in the step ST(22) determines whether the contents of the distance data register $M_{BRK}$ stored in the step ST(10) is an even number. If it is an even number, the period of reversal of the communication direction is set to the period $2T_2$ in the step ST(24). On the other hand, if the contents of the register $M_{BRK}$ is an odd number, the period of reversal of the communication direction is set to $T_2$ in the step ST(23).

Figure 12:
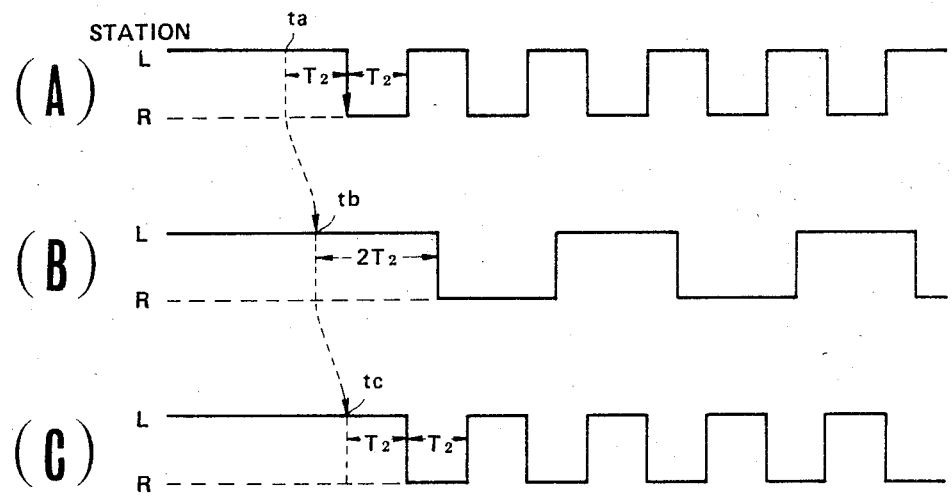
FIG. 12 is a timing chart of the operation of each station after a break-down in the system of the second preferred embodiment.

As shown in FIG. 12, the stations A and C at the odd-numbered locations from the break-down location carry out the reversal of the communication direction at periods of $T_2$ after the CPU 2 of these stations recognize the break-down. In the station B, which is at an even-numbered location from the break-down location, the reversal of the communication direction is executed at periods of $2T_2$.

In the method described above, since two different periods of reversal of the communication direction are set depending on whether the station involved is at an even-odd-ordered separation from the break-down location, the period of reversal the communication direction is $2T_2$ at most so that there is no significant delay in the communication over the system.

As described above, the data transmission/reception system according to the present invention can transmit information between adjacent stations securely even in cases where bidirectional communication by the loop-back method must be performed after the occurrence of a break-down without significantly reducing the transmission rate.

Furthermore, the data transmission/reception system according to the present invention can prevent communications between adjacent stations from being disrupted by errors in the period of reversal of the communication direction among stations.

It will fully be understood by those skilled in the art that the foregoing description is made in terms of the preferred embodiments and various modifications may be made without departing from the spirit and scope of the present invention, which is defined by the appended claims.

What is claimed is:

1. A loop-type data transmission/reception network system having a plurality of data processing stations and a single data transmission/reception route which interconnects said stations in a loop for transmitting necessary data between said stations in a first predetermined direction, each of said data processing stations comprising:
    (a) means for detecting break-downs in said data transmission/reception route between such station itself and an adjoining station in a second direction opposite to said first direction in which the data is normally transmitted;
    (b) means responsive to the detection of break-down in the data transmission/reception route between such station itself and said adjoining station by the detection means for transmitting the break-down information to a second adjoining station in said first predetermined direction; and
    (c) means for transmitting information on a reversal of the transmission direction in such station itself via the data transmission/reception route to the second adjoining station together with the break-down information transmitted by said break-down transmitting means before such station itself reverses the transmission direction thereof.

2. The loop-type data transmission/reception network system as set forth in claim 1, wherein said information transmitting means of each station includes means for transmitting distance data indicative of the number of stations between such station and a station which detected the break-down in said data transmission/reception route.

3. The loop-type data transmission/reception network system as set forth in claim 2, wherein each station further comprises:
    (a) means for determining whether such station is one of two end stations closest to the point of break-down as indicated by said distance data; and
    (b) means for reversing the transmission direction when said determining means determines that such station is one of the two end stations.

4. The loop-type data transmission/reception network system as set forth in claim 3, wherein said reversing means further comprises means for activating said direction reversing means at a frequency corresponding to the number of stations indicated by the distance data from said distance data transmitting means.

5. The loop-type data transmission/reception network system as set forth in claim 3, wherein said reversing means further comprises means for reversing the direction of transmission and reception after said distance data transmission means transmits the distance data.

6. A method for transmitting and receiving data in a loop-back form for use with a loop-type data transmission/reception network system via a data common bus which interconnects a plurality of data processing stations serially in the loop form when a part of said common data bus between any two of said stations breaks down, comprising the steps of:
    (a) determining that there is a break-down in said common bus between one station and an adjacent station located at a previous stage thereof relative to a first predetermined direction of data transmission when a formatted data is not received from the adjacent station located at the previous stage for a preset time;
    (b) informing a second adjacent station in said first predetermined direction of the occurrence of the break-down in said common bus between said one station and the adjacent station located at the previous stage relative to said first predetermined direction;
    (c) informing simultaneously with the step (b) the second adjacent station in said first predetermined direction that the transmission direction of data is to be reversed in an opposite direction; and (d) reversing the transmission direction of data in a second direction opposite to said first direction.

7. The method as set forth in claim 6, in which said step (c) includes the step (e) of informing the second adjacent station of a distance indicative of the number of stations from the station which first informs the break-down of said common data bus.

8. The method as set forth in claim 7, in which said step (b) further includes the step (f) of determining whether the one station is one of two end stations closest to the point of the break-down in said common data bus on a basis of the data informed from the adjoining station at the previous stage thereof in said step (e) and which further includes the step (g) of reversing the transmission direction of data in the first direction again when the one station is determined to be one of said two end stations in said step (f).

9. The method as set forth in claim 8, in which said step (b) further includes the step (h) of changing the contents of the data informed from the station at the previous stage thereof in said step (e) so as to give a distance from either end station when the one station is determined to be not one of said two end stations in said step (f).

10. The method as set forth in claim 7, in which said step (c) further includes, after the step (e), the step (i) of setting a fixed frequency at which one of said stations itself reverses the transmission direction of data according to a distance indicative of the number of stations from the station which first informs the break-down of said common data bus.

11. The method as set forth in claim 7, in which said step (c) further includes, after the step (e), the step (j) of setting a fixed frequency at which one of said stations itself reverses the transmission direction of data depending on whether the distance indicative the number of stations from the station which first informs the break-down of said common data bus is even number or not.

* * * * *